United States Patent Office 3,187,001
Patented June 1, 1965

3,187,001
CERTAIN 2,1-BENZISOTHIAZOLE COMPOUNDS
Robert F. Meyer, Ann Arbor, and Betty L. Cummings, Dearborn, Mich., assignors to Parke, Davis & Company, Detroit, Mich., a corporation of Michigan
No Drawing. Filed July 22, 1963, Ser. No. 296,498
6 Claims. (Cl. 260—304)

The present invention relates to novel chemical compounds having useful pharmacological activity and to means for producing the compounds. More particularly, the invention relates to 2,1-benzisothiazoles and to 2,1-benzisothiazolium salts having the following respective formulas:

(1)

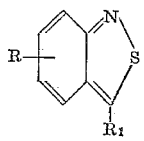

2)

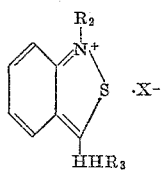

and pharmaceutically acceptable acid addition salts of the 2,1-benzisothiazoles; where R, which may be attached at the 5- or 6-position of the benzo group, represents hydrogen, a chlorine atom or a methyl or methoxy group, $R_1$ represents an —NH(lower alkyl) group (preferably an alkylamino group containing 1 to 3 carbon atoms), an N-pyrrolidinyl group or an —N(lower alkyl)$_2$ group, preferably a dimethylamino, ethylmethylamino, or diethylamino group, $R_2$ is a lower alkyl group, preferably a methyl or ethyl group, $R_3$ represents hydrogen or a methyl group, and X⁻ is a pharmaceutically acceptable anion such as a halide, sulfate or sulfonate anion.

According to one embodiment of the invention, the 2,1-benzisothiazoles are produced by subjecting an o-aminothiobenzamide of formula

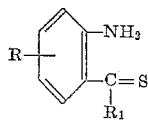

to oxidative cyclization by reacting the same with a mild oxidizing agent; where R and $R_1$ have the above-mentioned significance. As oxidizing agents for the reaction, one can use hydrogen peroxide in aqueous mineral acid, tertiary amines or lower alcohols; chloramines such as N-chlorobenzenesulfonamide, sodium derivative (Chloramine B) or N-chloro-p-toluenesulfonamide, sodium derivative (Chloramine T) in basic aqueous lower alcohols; sodium, potassium or ammonium persulfate in basic aqueous lower alcohols; iodine in basic aqueous sodium iodide solution or potassium iodide solution or in basic lower alcohols; or similar oxidizing agents. The preferred reagent is hydrogen peroxide in pyridine. The reaction conditions are subject to considerable variation. In the case of reaction with hydrogen peroxide, for example, the preferred reaction temperature is about 25 to 35° C., but the temperature may conveniently range from about 0 to 60° C. In general, at least one mole, and preferably a slight excess, of hydrogen peroxide per mole of the thioamide is employed. The reaction time for completion may vary anywhere from about one to 24 hours, although it is usually preferred to run the reaction for 14 to 18 hours. Production of the products by means of oxidative cyclization, as described, is preferred for those compounds in which the group $R_1$ is a monoalkylamino group.

In another embodiment, the 2,1-benzisothiazoles are produced by subjecting an o-nitrothiobenzamide of formula

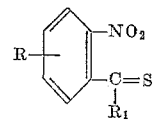

to reductive cyclization by reacting the same with a mild reducing agent; where R and $R_1$ have the above-mentioned significance. As reducing agents for the reaction, one can use zinc, iron or tin in acetic or hydrochloric acid; zinc, ferrous or stannous salts in acetic or hydrochloric acid; sodium, potassium or ammonium sulfide in basic aqueous lower alcohols; or similar reducing agents. The preferred reagent is stannous chloride in hydrochloric acid. The reaction conditions are subject to considerable variation. In the case of stannous chloride, for example, at least two moles and preferably a slight excess are used per mole of thioamide, but larger excesses can be employed if desired. The reaction proceeds at ordinary temperature, preferably in the range from about 20 to 30° C., and this range can be exceeded if desired, for example, from about 10 to 50° C. Following addition of stannous chloride, the reaction is ordinarily complete in a short period; e.g., about 1 to 10 hours. For optimum yields, the reaction is generally allowed to proceed for about 3 hours. Production of the products by means of reductive cyclization, as described, is preferred for those compounds in which $R_1$ represents a tertiary amine group.

In a still further embodiment, the 2,1-benzisothiazolium salts are produced by reacting a 3-amino-2,1-benzisothiazole of formula

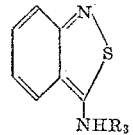

with a lower alkyl ester quaternizing agent $R_2X$; where $R_2$ and $R_3$ have the foregoing significance. Suitable quaternizing agents are the lower alkyl (preferably methyl or ethyl) esters of inorganic or organic sulfonic acids such as methyl iodide, ethyl bromide, dimethyl sulfate, diethyl sulfate, methyl benzenesulfonate, ethyl p-toluenesulfonate and the like. Since the starting material contains two nitrogen atoms (Formula 1 above where R is hydrogen and $R_1$ is an amino function), one nuclear and the other as a ring substituent, thereby leading to the theoretical possibility of mono- or bis-salt formation at both nitrogen atoms, it is indeed surprising that the reaction goes exclusively to the formation of the desired monoquaternary at the nuclear nitrogen atom. At least one mole and usually an excess of quaternizing agent is employed for each mole of isothiazole. The temperature is not critical, but the reaction is favored by heating up to the reflux temperature of the reaction mixture. A nonreactive organic solvent is ordinarily used for the reaction. Among the many solvents which may be used are the lower alkyl ethers such as diethyl, dipropyl, diisopropyl, and dibutyl ethers; lower alkanols such as methanol, ethanol, propanol and isopropanol; di-alkyl ketones such as acetone, diethyl ketone, methyl ethyl ketone and methyl isobutyl ketone; lower aliphatic nitriles such as acetonitrile and propionitrile; lower alkyl esters of lower alkanoic acids such as methyl acetate, ethyl acetate, isopropyl acetate, and methyl and ethyl propionate; aromatic hydrocarbons such as benzene, toluene, xylene and ethyl benzene; cyclic ethers such as tetrahydrofuran and tetrahydropyran; and chlorinated lower alkanes such as chloroform, carbon tetrachloride, dichloromethane, and 1,2-dichloroethane. Acetonitrile is the preferred solvent for quaternization. The reaction is complete within a short period, i.e., within about 1 to 4 hours, two hours being the preferred reaction time in most cases.

As indicated above, the 2,1-benzisothiazole products of the invention occur in both the free base form and the acid addition salt form. The latter form exists as the mono-salt, the acid moiety being attached at the nuclear nitrogen atom. To obtain the acid salt from the free base, the latter is reacted by conventional means with at least one mole of an organic or inorganic acid in the presence of a suitable organic solvent of the type described above for quaternization and in which the intended salt is insoluble, thereby permitting isolation of the desired salt product by filtration, decantation or other suitable means. On the other hand, where it is desired to convert the acid salt to the free base, the same can be accomplished by dissolving the salt in a suitable solvent such as water, aqueous methanol, etc., neutralizing the solution with a basic material such as sodium hydroxide, ammonium hydroxide and the like, and isolating the desired free base by extraction with an inert organic solvent. Some examples of the acid addition salts of the invention are the inorganic acid addition salts such as the hydrochloride, hydrobromide, nitrate, sulfate and phosphate, and organic acid addition salts such as the carbonate, benzoate, acetate, citrate, gluconate, ascorbate and benzenesulfonate. Whereas both the free base and acid addition salt forms of the products are useful for the purposes of the invention, the salts are generally preferred in those cases where increased water solubility is desired.

The products of the invention possess outstanding pharmacologic activity. In particular, the products possess one or more properties such as analgetic, antiinflammatory, antibradykinin and gastric secretory inhibiting properties when administered orally or parenterally at well tolerated dose levels. Consequently, the products have application as analgetic, anti-inflammatory and gastric secretory inhibiting agents for oral or parenteral use.

The o-amino- and o-nitro-thiobenzamide starting materials for the production of the products of the invention may be prepared by reacting the corresponding o-amino- and o-nitro-benzamides with an equivalent of phosphorous pentasulfide at reflux temperature in pyridine followed by hydrolysis of the phosphorous compound in boiling water, preferably in the presence of an organic solvent such as benzene. The reaction product can be used either in crude form or in purified form obtained by crystallization from a suitable organic solvent.

The invention is illustrated by the following examples.

*Example 1*

To a solution of 33.2 g. (0.20 mole) of o-amino-N-methylthiobenzamide in 60 ml. of pyridine at 35° C. is added dropwise, with stirring, 25 ml. of 30% hydrogen peroxide (containing 8.3 g. or 0.24 mole of hydrogen peroxide). After standing at room temperature for 16 hours, the reaction mixture is poured into 1.5 liters of ice water. The product, 3-methylamino-2,1-benzisothiazole, is removed by filtration, washed with water, dried and crystallized from ethanol; M.P., 206–207° C. The corresponding monohydrochloride salt is prepared by dissolving the free base in ether and treating the solution with an exces of dry hydrogen chloride.

The starting material for the reaction can be prepared as follows: To a solution of 60 g. (0.40 mole) of o-amino-N-methylbenzamide in 150 ml. of pyridine is added 89 g. (0.40 mole) of phosphorous pentasulfide. The reaction mixture is heated at reflux for 1.5 hours, cooled and poured into 1.5 liters of ice water. The precipitated solid is collected by filtration and then heated at reflux with a mixture of one liter of benzene and 500 ml. of water for 6 hours, two clear phases being obtained. The organic layer is separated, washed with water, concentrated and cooled to provide o-amino-N-methylthiobenzamide as yellow crystals, M.P. 107–108° C.

*Example 2*

To a solution of 52 g. (0.22 mole) of o-amino-N-ethylthiobenzamide in 100 ml. of pyridine is added dropwise at 35° C. 35 ml. of 30% hydrogen peroxide (containing 11.6 g. or 0.34 mole hydrogen peroxide). After standing for 16 hours, the product, 3-ethylamino-2,1-benzisothiazole, is removed by filtration, washed first with pyridine and then with water, and dried; M.P., 195–196° C. after recrystallization from ethanol. A water-soluble hydrobromide is obtained by treating an ethereal solution of this free base with a slight excess of hydrogen bromide in isopropyl alcohol. A citrate is obtained by mixing methanol solutions of the free base and an equivalent of citric acid and concentrating to a small volume.

The starting material for the reaction can be prepared as follows: To a solution of 62 g. (0.38 mole) of o-amino-N-ethylbenzamide in 150 ml. of pyridine is added 84 g. (0.38 mole) of phosphorous pentasulfide. The reaction mixture is refluxed for 1½ hours, cooled and poured into 1.5 liters of ice water. The precipitated solid is removed by filtration and then heated at reflux with a mixture of one liter of benzene and 500 ml. of water until two clear phases are obtained (6 hours). The organic layer is separated, washed with water, concentrated and cooled. The o-amino-N-ethylthiobenzamide is obtained as yellow crystals; M.P. 67–68° C.

By using the procedures described in Examples 1 and 2, the following 3-alkylamino-2,1-benzisothiazoles are prepared from the corresponding o-amino-N-alkylthiobenzamides, as follows, which in turn are prepared from the corresponding o-amino-N-alkylbenzamides. The melting points of these novel thio compounds, for convenience tabulated with reference to the alkyl group thereof, are listed as follows:

| Alkyl Group | M.P., °C. (from ethanol) 3-alkylamino-2,1-benzisothiazole | M.P., °C., o-amino-N-alkythiobenzamide |
| --- | --- | --- |
| Propyl | 167–168 | 94–95 |
| Isopropyl | 188–189 | 99–100 |
| Isobutyl | 179–181 | 94–95 |
| Sec.-butyl | 206–207 | 88–89 |

*Example 3*

To a solution of 43 g. (0.20 mole) of 2-amino-4-chloro-N-ethylthiobenzamide in 100 ml. of pyridine at 35° C. is added dropwise, with stirring, 25 ml. of 30% hydrogen peroxide (containing 8.3 g. or 0.24 mole of hydrogen peroxide). After standing at 25° C. for 16 hours the mixture is chilled and the product, 6-chloro-3-ethylamino-2,1-benzisothiazole, removed by filtration, washed with water and dried; M.P. 231–232° C. after crystallization from ethanol. The hydrochloride salt of the free base product is prepared by dissolving the free base in ether and treating the solution with an excess of dry hydrogen chloride. The hydrobromide salt is prepared in the same way by substituting dry hydrogen bromide for the hydrogen chloride.

The starting material can be prepared as follows: A mixture of 101 g. (0.50 mole) of 4-chloro-2-nitrobenzoic acid and 150 ml. of thionyl chloride is heated at reflux until hydrogen chloride evolution ceased. The excess thionyl chloride is removed in vacuo leaving an oil. To this is added, with stirring and cooling, a solution of 90 g. (2.0 moles) of ethylamine in 200 ml. of ether. The mixture is stirred for one hour, diluted with an equal volume of water, cooled and filtered. The product, 4-chloro-2-nitro-N-ethylbenzamide, is washed thoroughly with water, dried and crystallized from ethanol; M.P. 126–128° C.

A mixture of 45.7 g. (0.20 mole) of 4-chloro-2-nitro-

N-ethylbenzamide, 150 ml. of methanol and 100 mg. of platinum oxide is shaken at room temperature with hydrogen at 50 p.s.i. When the calculated amount of hydrogen is taken up, the catalyst is removed by filtration. Concentration and chilling of the filtrate give colorless crystals of 2-amino-4-chloro-N-ethylbenzamide; M.P., 96–98° C. The latter product is reacted with phosphorous pentasulfide in accordance with the corresponding procedure of Example 1 to give 2-amino-4-chloro-N-ethylthiobenzamide; M.P., 118–119° C.

Example 4

To a solution of 38.8 g. (0.20 mole) of 2-amino-4-methyl-N-ethylthiobenzamide in 70 ml. of pyridine at 30–35° C. is added dropwise, with stirring, 25 ml. of 30% hydrogen peroxide (containing 8.3 g. or 0.24 mole of hydrogen peroxide). After standing at 25° C. for 16 hours, the mixture is chilled and the product, 3-ethylamino-6-methyl-2,1-benzisothiazole, removed by filtration, washed with water and dried; M.P., 225–226° C. after recrystallization from ethanol. The hydrochloride, hydrobromide, sulfate, sulfamate and p-toluenesulfonate salts can be prepared by treating an ether solution of the free base product with at least one equivalent of the corresponding acid.

The thiobenzamide starting material (M.P., 102–103° C.) is prepared by converting 4-methyl-2-nitrobenzoic acid to the acid chloride and thence to the ethylamide (M.P., 125–126° C.), reducing the latter with platinum oxide-Raney nickel catalyst, to the aminoamide (M.P., 93–94° C.), all in accordance with the corresponding procedure of Example 3, and converting the amide to the thioamide as described under Example 1.

Example 5

To a solution of 42 g. (0.20 mole) of 2-amino-4-methoxy-N-ethylthiobenzamide in 100 ml. of pyridine at 30–35° C. is added dropwise, with stirring, 25 ml. of 30% hydrogen peroxide (containing 8.3 g. or 0.24 mole of hydrogen peroxide). After standing at 25° C. for 16 hours, the reaction mixture is diluted with 1.5 liters of ice water. The product, 3-ethylamino-6-methoxy-2,1-benzisothiazole, is removed by filtration, washed with water, dried and crystallized from ethanol; M.P., 181–182° C.

The thiobenzamide starting material (M.P., 92–93° C.) can be prepared by converting 4-methoxy-2-nitrobenzoic acid to the acid chloride and thence to the ethylamide (M.P., 114–116° C.), reducing the latter with Raney nickel catalyst to the aminoamide (M.P., 117–119° C.), all in accordance with Example 3, and converting the amide to the thioamide as described under Example 1.

Example 6

To a well stirred suspension of 109 g. (0.52 mole) of o-nitro-N,N-dimethylthiobenzamide in one liter of concentrated hydrochloric acid at 25° C. is added dropwise a solution of 257 g. (1.14 moles) of stannous chloride dihydrate in 250 ml. of concentrated hydrochloric acid. The mixture is stirred an additional 3 hours at 25° C. and is then cooled in ice. The solid tin complex is removed by filtration and washed with benzene. The solid is suspended in a mixture of one liter of benzene and 500 ml. of water and, while cooling below 20° C., an excess of 50% aqueous sodium hydroxide is added. The benzene layer is separated, washed with water and concentrated to give, on cooling, the desired product. This product, 3-dimethylamino-2,1-benzisothiazole, melts at 120–121° C. after recrystallization from aqueous ethanol.

The starting material can be prepared as follows: A mixture of 208 g. (1.07 moles) of o-nitro-N,N-dimethylbenzamide, 240 g. (1.08 moles) of phosphorous pentasulfide and 800 ml. of pyridine is heated at reflux for 1.5 hours. The reaction mixture is poured into two liters of water and the precipitated solid complex removed by filtration. After washing with water, the solid is suspended in a mixture of two liters of benzene and 500 ml. of water and heated at reflux for 4 hours. The organic layer is separated, washed with water and concentrated to a volume of about one liter to give on cooling, 166 g. of o-nitro-N,N-dimethylthiobenzamide; M.P., 160–161° C. after recrystallization from aqueous ethanol.

Example 7

To a well-stirred suspension of 118 g. (0.50 mole) of N-(o-nitrothiobenzoyl)-pyrrolidine in one liter of concentrated hydrochloric acid at 25° C. is added dropwise a solution of 257 g. (1.14 moles) of stannous chloride dihydrate in 250 ml. of concentrated hydrochloric acid. The mixture is stirred an additional 3 hours at the same temperature and is then cooled in ice. The solid tin complex is removed by filtration and washed with benzene. The solid is suspended in a mixture of one liter of benzene and 500 ml. of water and, while cooling below 20° C., an excess of 50% aqueous sodium hydroxide is added. The benzene layer is separated, washed with water and concentrated to give the product on cooling. This product is 3-(1-pyrrolidinyl)-2,1-benzisothiazole; M.P., 144–145° C. after recrystallization from aqueous ethanol. The hydrochloride salt is prepared by treating an isopropanolic solution of the free base with anhydrous hydrogen chloride. This hydrochloride salt melts at 210–215° C. with decomposition.

The pyrrolidine starting material (M.P., 129–130° C.) can be prepared by converting o-nitrobenzoic acid to the acid chloride and thence to the N-nitrobenzoylpyrrolidine by reaction with pyrrolidine as in the procedure of Example 3, and converting the amide to the thioamide as described under Example 1.

Example 8

To a well-stirred suspension of 122 g. (0.50 mole) of 4-chloro-2-nitro-N,N-dimethylthiobenzamide in one liter of concentrated hydrochloric acid at 25° C. is added dropwise a solution of 257 g. (1.14 moles) of stannous chloride dihydrate in 250 ml. of concentrated hydrochloric acid. The mixture is stirred an additional 3 hours at the same temperature and then cooled in ice. The solid tin complex is removed by filtration and washed with benzene. The solid is suspended in a mixture of one liter of benzene and 500 ml. of water and, while cooling below 20° C., an excess of aqueous 50% sodium hydroxide is added. The benzene layer is separated, washed with water and concentrated to give, on cooling, the desired product, 6-chloro-3-dimethylamino-2,1-benzisothiazole; M.P., 134–135° C. after recrystallization from aqueous ethanol.

The starting material, 4-chloro-2-nitro-N,N-dimethylbenzamide, can be prepared by converting 4-chloro-2-nitrobenzoic acid (M.P., 132–133° C.) to the acid chloride and hence to the dimethylamide (M.P., 91–92° C.) by reaction with dimethylamine, as in the procedure under Example 3, and thereafter converting the amide to the thioamide as described under Example 1.

Example 9

To a solution of 15 g. (0.10 mole) of 3-amino-2,1-benzisothiazole in 150 ml. of acetonitrile is added 71 g. (0.50 mole) of methyl iodide. The resulting solution is heated at reflux for 2 hours, and is then chilled and the product collected by filtration. The product, 3-amino-1-methyl-2,1-benzisothiazolium iodide, is purified by recrystallization from ethanol; M.P., greater than 200° C. with decomposition.

By substituting 0.50 mole of ethyl bromide or p-toluenesulfonate methyl ester in the above procedure in place of methyl iodide one obtains, respectively, 3-amino-1-ethyl-2,1-benzoisothiazolium bromide or 3-amino-1-methyl-2,1-benzoisothiazolium p-toluenesulfonate.

The starting material for the reaction can be prepared as follows: To a solution of 30.4 g. (0.20 mole) of o-amino-thiobenzamide in 55 ml. of pyridine is added dropwise at 35° C. 25 ml. of 30% hydrogen peroxide (containing 8.3 g. or 0.24 mole hydrogen peroxide). After standing at room temperature for 16 hours, the reaction mixture is poured into one and a half liters of ice water. The precipitated product is removed by filtration, washed with water and dried. The product is 3-amino-2,1-benzisothiazole; M.P., 178–179° C. after recrystallization from water or benzene.

*Example 10*

To a solution of 16.4 g. (0.10 mole) of 3-methylamino-2,1-benzisothiazole in 160 ml. of acetonitrile is added 71 g. (0.50 mole) of methyl iodide. The resulting solution is heated at reflux for 2 hours, the reaction mixture is chilled, and the product, 1-methyl-3-methylamino-2,1-benzisothiazolium iodide, collected by filtration; M.P., 210° C. with decomposition, after recrystallization from ethanol.

By substituting 0.50 mole of dimethyl sulfate or methyl benzenesulfonate in the above procedure in place of methyl iodide one obtains the related product, 1-methyl-3-methylamino-2,1-benzisothiazolium sulfate or 1-methyl-3-methylamino-2,1-benzisothiazolium benzenesulfonate, respectively.

*Example 11*

To a well-stirred suspension of 122 g. (0.50 mole) of 5-chloro-2-nitro-N,N-dimethylthiobenzamide in one liter of concentrated hydrochloric acid at 25° C. is added dropwise a solution of 257 g. (1.14 moles) of stannous chloride dihydrate in 250 ml. of concentrated hydrochloric acid. The mixture is stirred an additional 3 hours at 25° C. and then cooled in ice. The solid tin complex is removed by filtration and washed with benzene. The solid is suspended in one liter of benzene and 500 ml. of water and, while maintaining the temperature below 20° C., an excess of aqueous 50% sodium hydroxide is added. The organic layer is separated, washed with water and concentrated to give, on cooling, the desired product, 5-chloro-3-dimethylamino-2,1-benzisothiazole; M.P. 140–141° C. after recrystallization from aqueous ethanol.

The starting material can be prepared, in accordance with the procedure set forth under Example 6, by reacting phosphorous pentasulfide with 5-chloro-2-nitro-N,N-dimethylbenzamide which in turn can be prepared from 5-chloro-2-nitrobenzoic acid, thionyl chloride and dimethylamine in accordance with the procedure described under Example 3.

We claim:

1. A compound selected from the group consisting of a 2,1-benzisothiazole and a 2,1-benzisothiazolinium salt having the respective formulas

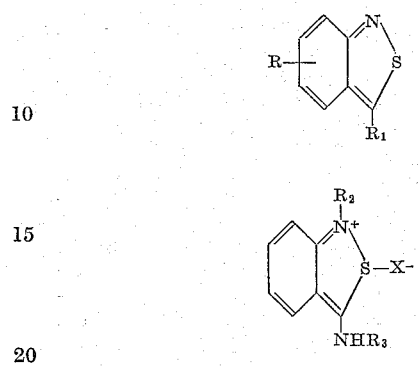

and pharmacetuically acceptable acid addition salts of said 2,1-benzisothiazole; where R is substituted at one of the 5- and 6-positions of the benzo ring and is a member of the group consisting of hydrogen, chlorine, methyl, and methoxy, $R_1$ is a member of the group consisting of —NH(lower alkyl), N-pyrrolidinyl, and —N(lower alkyl)$_2$, $R_2$ is a lower alkyl group, $R_3$ is a member of the group consisting of hydrogen and methyl, and $X^-$ is a pharmaceutically acceptable anion.

2. 3-methylamino-2,1-benzisothiazole.
3. 3-ethylamino-2,1-benzisothiazole.
4. 3-isopropylamino-2,1-benzisothiazole.
5. 3-ethylamino-6-methyl-2,1-benzisothiazole.
6. 6-chloro-3-dimethylamino-2,1-benzisothiazole.

References Cited by the Examiner

UNITED STATES PATENTS 2,708,669    5/55    Larive et al. _____ 260—304

OTHER REFERENCES

Bambas: Heterocyclic Compounds (New York, 1952), pages 225–6.

NICHOLAS S. RIZZO, *Primary Examiner.*